US012214333B2

(12) United States Patent
Ifrah et al.

(10) Patent No.: US 12,214,333 B2
(45) Date of Patent: Feb. 4, 2025

(54) MIXED OXIDE BASED ON CERIUM AND ZIRCONIUM

(71) Applicant: RHODIA OPERATIONS, Aubervilliers (FR)

(72) Inventors: Simon Ifrah, La Jarrie (FR); Rui Jorge Coelho Marques, Shanghai (CN); Wei Li, Shanghai (CN); Ling Zhu, Jiangsu (CN)

(73) Assignee: RHODIA OPERATIONS, Lyons (FR)

( * ) Notice: Subject to any disclaimer, the term of this patent is extended or adjusted under 35 U.S.C. 154(b) by 534 days.

(21) Appl. No.: 17/627,151

(22) PCT Filed: Jul. 15, 2020

(86) PCT No.: PCT/CN2020/102176
§ 371 (c)(1),
(2) Date: Jan. 14, 2022

(87) PCT Pub. No.: WO2021/013016
PCT Pub. Date: Jan. 28, 2021

(65) Prior Publication Data
US 2022/0297091 A1    Sep. 22, 2022

(51) Int. Cl.
| | |
|---|---|
| *B01J 23/10* | (2006.01) |
| *B01D 53/94* | (2006.01) |
| *B01J 35/50* | (2024.01) |
| *B01J 35/56* | (2024.01) |
| *B01J 35/61* | (2024.01) |
| *B01J 35/63* | (2024.01) |
| *B01J 37/00* | (2006.01) |
| *B01J 37/03* | (2006.01) |
| *B01J 37/04* | (2006.01) |
| *B01J 37/08* | (2006.01) |
| *C01G 25/00* | (2006.01) |

(52) U.S. Cl.
CPC ............ *B01J 23/10* (2013.01); *B01D 53/945* (2013.01); *B01J 35/50* (2024.01); *B01J 35/56* (2024.01); *B01J 35/613* (2024.01); *B01J 35/635* (2024.01); *B01J 35/638* (2024.01); *B01J 37/0018* (2013.01); *B01J 37/0027* (2013.01); *B01J 37/031* (2013.01); *B01J 37/04* (2013.01); *B01J 37/088* (2013.01); *C01G 25/006* (2013.01); *B01D 2255/102* (2013.01); *B01D 2255/2061* (2013.01); *B01D 2255/2063* (2013.01); *B01D 2255/2065* (2013.01); *B01D 2255/20715* (2013.01); *B01D 2255/2092* (2013.01); *B01D 2255/407* (2013.01); *B01D 2255/9155* (2013.01); *B01D 2255/9207* (2013.01); *C01P 2002/52* (2013.01); *C01P 2004/61* (2013.01); *C01P 2006/12* (2013.01); *C01P 2006/14* (2013.01); *C01P 2006/22* (2013.01)

(58) Field of Classification Search
None
See application file for complete search history.

(56) References Cited

U.S. PATENT DOCUMENTS

| | | | |
|---|---|---|---|
| 5,992,773 | A | 11/1999 | Schwechten |
| 8,640,440 | B2 | 2/2014 | Klingmann et al. |
| 2002/0187894 | A1 | 12/2002 | Domesle et al. |
| 2018/0008973 | A1 | 1/2018 | Gramiccioni et al. |
| 2019/0168188 | A1 | 6/2019 | Jorge Coelho Marques et al. |

FOREIGN PATENT DOCUMENTS

| | | | | |
|---|---|---|---|---|
| CN | 107405571 | A | 11/2017 | |
| WO | 2012072439 | A1 | 6/2012 | |
| WO | 2017060694 | A1 | 4/2017 | |
| WO | 2017109514 | A1 | 6/2017 | |
| WO | WO-2017185224 | A1 * | 11/2017 | ............. B01D 53/94 |
| WO | 2018115436 | A1 | 6/2018 | |
| WO | WO-2019043346 | A1 * | 3/2019 | |

OTHER PUBLICATIONS

Machine Translation WO2019043346, Bisson Laure, Mar. 7, 2019 (Year: 2019).*
Stephen Brunauer, P. H. Emmett, Edward Teller—Adsorption of Gases in Multimolecular Layers—J. Am. Chem. Soc. 1938, 60, 2, 309-319—doi: 10.1021/ja01269a023.

* cited by examiner

*Primary Examiner* — Coris Fung
*Assistant Examiner* — Jialan Zhang
(74) *Attorney, Agent, or Firm* — Osha Bergman Watanabe & Burton LLP

(57) ABSTRACT

A mixed oxide, a catalytic composition, a catalytic wall-flow monolith, the use of the mixed oxide and the process of the preparation of the mixed oxide. The mixed oxide comprises zirconium, cerium, lanthanum and optionally at least one rare earth element other than cerium and other than lanthanum. The catalytic composition and the wall-flow monolith comprise the particles of the mixed oxide. The use of the mixed oxide is in the preparation of a coating on a filter. The process of preparation of the mixed oxide consists jet milling. The mixed oxide is a compromise between a calibrated size and a low viscosity when in the form of an aqueous slurry while retaining a high specific surface area and a high pore volume.

34 Claims, No Drawings

MIXED OXIDE BASED ON CERIUM AND ZIRCONIUM

The present application is a national stage entry of PCT/CN2020/102176, filed on 15 Jul. 2020, which claims the priority of international patent application PCT/CN2019/096864 filed on 19 Jul. 2019, the content of which being entirely incorporated herein by reference for all purposes. In case of any incoherency between the present application and the PCT application that would affect the clarity of a term or expression, it should be made reference to the present application only.

The present invention relates to a mixed oxide based upon cerium, zirconium, lanthanum and optionally at least one rare earth element other than cerium and other than lanthanum exhibiting a compromise between the viscosity of an aqueous slurry, the porosity and the thermal resistance at high temperature. It also relates to a catalytic composition comprising the particles of said mixed oxide and to the use of said composition in the preparation of a coating on a filter.

TECHNICAL CONTEXT

Gasoline engines produce combustion exhaust streams containing hydrocarbons, carbon monoxide, and oxides of nitrogen in conjunction with particulates. It is known to treat the gases with a three-way catalyst composition, and it is known to recover the particulates in particulate traps such as soot filters.

Historically, gasoline engines which are operated predominantly stoichiometrically have been designed such that low levels of particulates were formed. However, gasoline direct injection (GDI) engines, which are finding increasing application due to their fuel efficiency, can have lean burn conditions and stratified combustion resulting in the generation of particulates. Particulate emissions for engines fueled by gasoline fuel, such as gasoline direct injection engines, are being subject to regulations and existing after-treatment systems for gasoline engines are not suitable for achieving the proposed particulate matter standard.

In contrast to particulates generated by diesel lean burning engines, the particulates generated by gasoline engines tend to be finer and at lower levels. This is due to the different combustion conditions of a diesel engine as compared to a gasoline engine. For example, gasoline engines run at a higher temperature than diesel engines. Also, the resultant hydrocarbon components are different in the emissions of gasoline engines as compared to diesel engines.

Emission standards for unburned hydrocarbons, carbon monoxide and nitrogen oxide pollutants continue to become more stringent. In order to meet such standards, catalytic converters containing a three-way catalyst (TWC) are located in the exhaust gas line of gasoline-fueled internal combustion engines. Such catalysts promote the oxidation by oxygen and oxides of nitrogen in the exhaust gas stream of unburned hydrocarbons and carbon monoxide, as well as the concomitant reduction of nitrogen oxides to nitrogen.

The new Euro 6 (Euro 6 and Euro 6c) emission standard presents a number of challenging design problems for meeting gasoline emission standards. In particular, how to design a filter or an exhaust system including a filter, for reducing the number of particulate matter (PM) gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

It is known in gasoline systems to provide a three-way catalyst (TWC) located on a substrate carrier, such as a flow-through monolith. It is also known to combine the TWC and particulate removal functions in a single device by coating a TWC onto a wall-flow monolith (particulate filter).

Problem to be Solved

The mixed oxide is mixed with other inorganic materials in the form of a slurry and the slurry is coated on the substrate carrier, such as a flow-through monolith or a filter. A difficulty is that the slurry maintains a viscosity that is not too high so that it can be processed easily and that it does not affect the performance of the coating. The invention aims at providing a mixed oxide that can be easily coated on an substrate carrier, more particularly on a wall-flow monolith or a filter, while still exhibiting a high specific surface area and a high pore volume. The mixed oxide of the invention is a compromise between a calibrated size and a low viscosity when in the form of an aqueous slurry while retaining a high specific surface area $S_{1100°\ C./4\ h}$ and a high pore volume (TPV and $PV_{0-300\ nm}$).

Technical Background

U.S. Pat. No. 8,640,440 discloses a filter with two layers, one of the layers containing an oxygen-storing cerium/zirconium mixed oxide.

WO 2017/060694 discloses a NOx absorber. There is no mention of a mixed oxide with the characteristics of d50 or d90.

US 2019/168188 discloses a mixed oxide of zirconium, of cerium, of lanthanum and optionally of at least one rare earth metal other than cerium and lanthanum but does not disclose the total pore volume, d50 and d90.

BRIEF DESCRIPTION OF THE INVENTION

The invention relates to a mixed oxide as disclosed in claims 1-32. The mixed oxide comprises zirconium, cerium, lanthanum and optionally at least one rare earth element other than cerium and other than lanthanum (RE) with the following composition:
- between 8.0% and 45.0% by weight of cerium;
- between 1.0% and 15.0% by weight of lanthanum;
- up to 15.0% by weight of the rare earth element other than cerium and other than lanthanum;
- the total proportion of lanthanum and the rare earth element(s) other than cerium and other than lanthanum being lower than and equal to 25.0%, more particularly lower than and equal to 20.0%, even more particularly lower than or equal to 18.0%;
- the remainder as zirconium;

exhibiting the following properties after calcination in air at 1100° C. for 4 hours:
- a specific surface area ($S_{1100°\ C./4\ h}$) between 25 and 50 $m^2/g$, more particularly between 28 and 50 $m^2/g$, even more particularly between 30 and 50 $m^2/g$;
- a pore volume ($PV_{0-300\ nm}$) determined by mercury porosimetry for the pores having a diameter below 300 nm between 0.50 $cm^3/g$ and 0.90 $cm^3/g$, more particularly between 0.50 $cm^3/g$ and 0.80 $cm^3/g$, even more particularly of between 0.50 $cm^3/g$ and 0.70 $cm^3/g$;

the mixed oxide being in the form of particles with the following properties:
- a d50 between 1.0 μm and 2.5 μm, more particularly between 1.0 μm and 2.2 μm, even more particularly between 1.0 μm and 2.0 μm or between 1.5 μm and 2.0 μm;
- a d90 between 2.0 μm and 9.0 μm, more particularly between 2.0 μm and 8.0 μm, even more particularly between 2.0 μm and 7.0 μm or between 3.0 μm and 8.0 μm or between 3.0 μm and 7.0 μm.

The invention also relates to a catalytic composition as disclosed in the claims below and to a catalytic wall-flow monolith as disclosed in the claims below. It also relates to the use of the mixed oxide as disclosed in the claims below and to a process of preparation of the mixed oxide as disclosed in the claims below.

More details about these inventions are now given below.

DESCRIPTION OF THE INVENTION

The calcinations, more particularly the calcinations after which the values of specific surface area are calcinations in air, unless otherwise mentioned. It is also specified, for the continuation of the description, that, unless otherwise indicated, in all ranges of values which are given, the values at the limits are included. This applies also to the expressions comprising "at least", "at most" or "up to". In addition, the rare earth element other than cerium and other than lanthanum is noted RE.

The above mentioned elements (Ce, Zr, La, RE) are generally present in the mixed oxide as oxides. They may nonetheless be also partially present in the form of hydroxides or oxyhydroxides.

In addition to the above mentioned elements, the mixed oxide of the invention may also comprise the element hafnium. This element is usually present in combination with zirconium in the ores which are present in the natural state. The relative proportion of hafnium with respect to zirconium depends on the ore from which zirconium is extracted. The relative proportion by weight Zr/Hf in some ores may be around 50/1. Thus baddeleyite contains roughly 98% of $ZrO_2$ and 2% of $HfO_2$. As for zirconium, hafnium is generally present as an oxide. It is not excluded though that hafnium is also present partly in the form of an hydroxide or oxyhydroxide. The proportion of hafnium in the mixed oxide is lower than or equal to 2.5% 2.5%), even lower than or equal to 2.0% (≤2.0%).

As usual in the field of mixed oxides, the proportions of the elements are given by weight of oxide relative to the mixed oxide as a whole. For the calculations of these proportions, the following oxides are considered: $CeO_2$, $ZrO_2$, $HfO_2$, $La_2O_3$, $RE_2O_3$ for all RE except for Pr for which $Pr_6O_{11}$ is considered. As way of example, the proportions of the mixed oxide of example 1 (Zr—Ce—La 60%-35%-5%) correspond to: 60% $ZrO_2$, 35% $CeO_2$ and 5% $La_2O_3$. The proportions of the elements are determined by the usual analytical methods like X-ray fluorescence or by Inductively Coupled Plasma Mass Spectrometry.

The invention more particularly relates to a mixed oxide consisting of a combination of the oxides of zirconium; of cerium; of lanthanum; optionally of at least one rare earth element other than cerium and other than lanthanum (RE); and optionally of hafnium, with the following composition:
- between 8.0% and 45.0% by weight of cerium;
- between 1.0% and 15.0% by weight of lanthanum;
- up to 15.0% by weight of the rare earth element other than cerium and other than lanthanum;
- the total proportion of lanthanum and the rare earth element(s) other than cerium and lanthanum being lower than or equal to 25.0%, more particularly lower than or equal to 20.0%, even more particularly lower than or equal to 18.0%;
- a proportion of hafnium lower than or equal to 2.5%, even lower than or equal to 2.0%;
- the remainder as zirconium;

exhibiting the following properties after calcination in air at 1100° C. for 4 hours:
- a specific surface area ($S_{1100° C./4 h}$) between 25 and 50 $m^2/g$, more particularly between 28 and 50 $m^2/g$, even more particularly between 30 and 50 $m^2/g$;
- a pore volume determined by mercury porosimetry for the pores having a diameter below 300 nm between 0.50 $cm^3/g$ and 0.90 $cm^3/g$, more particularly between 0.50 $cm^3/g$ and 0.80 $cm^3/g$, even more particularly of between 0.50 $cm^3/g$ and 0.70 $cm^3/g$;

the mixed oxide being in the form of particles with the following properties:
- a d50 between 1.0 μm and 2.5 μm, more particularly between 1.0 μm and 2.2 μm, even more particularly between 1.0 μm and 2.0 μm or between 1.5 μm and 2.0 μm;
- a d90 between 2.0 μm and 9.0 μm, more particularly between 2.0 μm and 8.0 μm, even more particularly between 2.0 μm and 7.0 μm.

The mixed oxide of the invention comprises the above mentioned elements (Ce, Zr, Hf if any, La, RE(s) if any) with the above mentioned proportions but it may also additionally comprise other elements like impurities. The impurities may stem from the raw materials or starting materials used in the process of preparation of the mixed oxide. The total proportion of the impurities may generally be lower than 0.2% by weight with respect to the mixed oxide.

The mixed oxide comprises cerium. The proportion of cerium is between 8.0% and 45.0%, more particularly between 18.0% and 44.0%, even more particularly between 18.0% and 42.0%. This proportion may also be between 18.0% and 37.0% or between 18.0% and 22.0% or between 20.0% and 35.0% or between 22.0% and 26.0% or between 28.0% and 32.0% or between 33.0% and 37.0% or between 30% and 45% or between 38.0% and 42.0%.

The mixed oxide also comprises lanthanum. The proportion of lanthanum is between 1.0% and 15.0%. This proportion may be comprised between 1.0% and 13.0%, more particularly between 1.0% and 8.0%, even more particularly between 2.0% and 8.0% or between 3.0% and 9.0% or between 3.0 and 7.0%.

The mixed oxide may also comprise up to 15.0% by weight of at least one rare earth element other than cerium and other than lanthanum (RE). A rare earth element as defined by IUPAC is one of a set of seventeen chemical elements in the periodic table, specifically the fifteen lanthanides, as well as scandium and yttrium. The rare earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). More particularly, the rare earth element other than cerium and other than lanthanum may be Y or Nd or a combination of Y and Nd. The proportion of the rare earth element(s) other than cerium and other than lanthanum is thus between 0% and 15.0%. This proportion may be between 1.0% and 13.0%, more particularly between 1.0% and 8.0%, even more particularly between 2.0% and 8.0% or between 3.0% and 7.0%. It may also be between 10.0% and 13.0%.

The total proportion of lanthanum and of the rare earth element(s) other than cerium and other than lanthanum is lower than or equal to 25.0%, more particularly lower than or equal to 20.0%, even more particularly lower than or equal to 18.0%.

As far as the proportion of zirconium is concerned, zirconium is present as the remainder in the mixed oxide. The total of all the elements being 100%, the proportion of zirconium thus corresponds to the complement to 100% of the other elements of the mixed oxide.

The proportion of zirconium is higher than 45.0%, more particularly higher than 48.0%, even more particularly higher or equal to 50.0%. The proportion of zirconium may be between 48.0% and 80.0%. The mixed oxide of the invention may be described as a Zr-rich mixed oxide that is a mixed oxide with a weight ratio $ZrO_2/CeO_2>1.0$, more particularly with a weight ratio $ZrO_2/CeO_2 \geq 1.25$.

More specific compositions according to the invention are now given below:

Composition C1
 between 18.0% and 37.0% by weight of cerium;
 between 3.0% and 9.0% by weight of lanthanum;
 the remainder as zirconium.

For this composition C1, the proportion of cerium may be more particularly between 18.0% and 22.0% or between 33.0% and 37.0%. The proportion of lanthanum may be more particularly between 3.0% and 7.0%.

Composition C2
 between 30.0% and 45.0% by weight of cerium;
 between 3.0% and 9.0% by weight of lanthanum;
 between 3.0% and 9.0% by weight of at least one rare earth element other than cerium and other than lanthanum (RE);
 the remainder as zirconium.

For this composition C2, the proportion of cerium may be more particularly between 38.0% and 42.0% or between 33.0% and 37.0%. The proportion of lanthanum may be more particularly between 3.0% and 7.0%. The proportion of the rare earth element(s) other than cerium and other than lanthanum may be more particularly between 3.0% and 7.0%.

Composition C3
 between 20.0% and 35.0% by weight of cerium;
 between 3.0% and 9.0% by weight of lanthanum;
 between 3.0% and 15.0% by weight of at least one rare earth element other than cerium and other than lanthanum (RE);
 the remainder as zirconium.

For this composition C3, the proportion of cerium may be more particularly between 22.0% and 26.0% or between 28.0% and 32.0%. The proportion of lanthanum may be more particularly between 3.0% and 7.0%. The proportion of the rare earth element(s) other than cerium and other than lanthanum may be more particularly between 3.0% and 7.0%.

The particles of the mixed oxide of the invention are characterized by the following parameters. The particles exhibit a d50 between 1.0 µm and 2.5 µm, more particularly between 1.0 µm and 2.2 µm, even more particularly between 1.0 µm and 2.0 µm or between 1.5 µm and 2.0 µm. In an embodiment, d50<2.5 µm (strictly less than 2.5 µm).

The particles of the mixed oxide exhibit a d90 which is between 2.0 µm and 9.0 µm, more particularly between 2.0 µm and 8.0 µm, even more particularly between 2.0 µm and 7.0 µm or between 3.0 µm and 8.0 µm or between 3.0 µm and 7.0 µm.

The particles may exhibit a d10 lower than or equal to 1.0 µm ($\leq 1.0$ µm), more particularly lower than or equal to 0.8 µm ($\leq 0.8$ µm), even more particularly lower than or equal to 0.7 µm ($\leq 0.7$ µm)). d10 may be higher than or equal to 0.2 µm ($\geq 0.2$ µm), more particularly higher than or equal to 0.3 µm ($\geq 0.3$ µm). d10 may be between 0.2 µm and 1.0 µm, more particularly between 0.2 µm and 0.8 µm, even more particularly between 0.3 µm and 0.8 µm.

The particles may exhibit a d99 lower than or equal to 20.0 µm, more particularly lower than or equal to 15.0 µm. d99 may be higher than or equal to 5.0 µm, more particularly higher than or equal to 7.0 µm. d99 may be between 5.0 µm and 20.0 µm, more particularly between 7.0 µm and 20.0 µm, even more particularly between 7.0 µm and 15.0 µm.

d10, d50, d90 and d99 (in µm) have the usual meaning used in statistics. Thus, do (n=10, 50, 90 or 99) represents the particle size such that n % of the particles is less than or equal to said size. d50 thus represents the median value. They are determined from a distribution of size of the particles (in volume) obtained with a laser diffraction particle size analyzer. The conditions of measurement of the distribution given in the examples may apply.

The mixed oxide is also characterized by a high thermal resistance. This resistance is necessary as the coating needs to withstand high temperatures. On this respect, it must be borne in mind that gasoline engines are operated with a predominantly stoichiometric air/fuel mixture, so that the exhaust gases usually exhibit significantly higher temperatures than for lean burn engines. It is known that the temperatures at which a filter for gasoline engines operates are thus higher than for more conventional Diesel Particulate Filters. The specific surface area of the mixed oxide after calcination in air at 1100° C. for 4 hours ($S_{1100°\ C./4\ h}$) is between 25 and 50 m²/g, more particularly between 28 and 50 m²/g, even more particularly between 30 and 50 m²/g. This specific surface may be between 25 and 40 m²/g or between 25 and 35 m²/g or between 30 and 35 m²/g.

The specific surface area of the mixed oxide after calcination in air at 1000° C. for 4 hours ($S_{1000°\ C./4\ h}$) may be between 50 and 70 m²/g, more particularly between 55 and 70 m²/g.

The term "specific surface area (BET)" is understood to mean the BET specific surface area determined by nitrogen adsorption. The specific surface area is well-known to the skilled person and is measured according to the Brunauer-Emmett-Teller method. The theory of the method was originally described in the periodical "The Journal of the American Chemical Society, 60, 309 (1938)". More detailed information about the theory may also be found in chapter 4 of "Powder surface area and porosity", 2nd edition, ISBN 978-94-015-7955-1. The method of nitrogen adsorption is disclosed in standard ASTM D 3663-03 (reapproved 2008).

The mixed oxide of the invention is also characterized by a pore volume determined by mercury porosimetry for the pores having a diameter below 300 nm which is between 0.50 cm³/g and 0.90 cm³/g, more particularly between 0.50 cm³/g and 0.80 cm³/g, even more particularly of between 0.50 cm³/g and 0.70 cm³/g. This pore volume is determined on the mixed oxide after calcination in air at 1100° C. for 4 hours and is designated in the present application as $PV_{0-300\ nm}$.

The mixed oxide may also be characterized by a total pore volume which is between 1.40 cm³/g and 3.00 cm³/g, more particularly of between 1.50 cm³/g and 3.00 cm³/g, even more particularly between 1.50 cm$^3$/g and 2.50 cm$^3$/g or between 1.50 cm$^3$/g and 2.20 cm$^3$/g. This total pore volume may be at least 1.60 cm$^3$/g. This total pore volume is determined on the mixed oxide after calcination in air at 1100° C. for 4 hours and is designated in the present application as TPV.

Mercury porosimetry is a standard technique used in the field of porous catalysts and consists in the progressive intrusion of mercury into the pores of a porous structure under controlled pressures. The porosity is measured by mercury intrusion according to the well-known techniques in the field. The porosity may be determined according to the guidelines of the constructor using a Micromeritics V 9620 Automatic Mercury Porosimeter. The porosimeter comprises a powder penetrometer. The method is based on the determination of the pore volume as a function of the pore size (V=f(d), V denoting the pore volume and d denoting the pore diameter). From the data, it is possible to obtain a curve (C) giving the derivative dV/d log D. From curve (C), the pore volume $PV_{0-300\ nm}$ and the total pore volume TPV are determined.

The procedures outlined in ASTM International test method D 4284-07 are preferably followed. Under followed conditions, the sample size is around 0.5 grams, the mercury contact angle is 130°, the mercury surface tension is 485 dyn/cm.

It must be noted that when a mixed oxide is ground or milled, its specific surface area and its total pore volume usually tend to decrease. The interest of the mixed oxide of the invention is that, with the process used and despite the reduction of size of the particles in step (g1), the specific surface area does not decrease too much and the total pore volume remains high.

The mixed oxide of the invention is also characterized by a low viscosity of a dispersion of the particles in water. Indeed, the viscosity of a dispersion containing 43.0 wt % particles of the mixed oxide in water and exhibiting a pH of 4.0±0.1 is lower than or equal to 20.0 cP (≤20.0 cP). The viscosity is measured at 20° C.±1° C. The viscosity is given for a shear rate applied between 5.0 and 10.0 s$^{-1}$. The pH may be adjusted with acetic acid. The viscosity may be determined by any type of rheometer, more particularly one adapted to the measurement of the viscosity of suspensions/dispersions exhibiting a low viscosity (<50 cP). The rheometer may be the Brookfield DV2T.

More particularly, the following method may be applied for the measurement of the viscosity of the dispersion:
(1) an homogeneous dispersion of the mixed oxide is prepared by mixing the particles of the mixed oxide in water;
(2) the viscosity is then recorded with the rheometer over time. When the viscosity is stabilized, it is measured.

In step (1), the powder of the mixed oxide is added to water under stirring, eg in about 15-20 min. The pH of the dispersion may be adjusted to the targeted pH with the addition of acetic acid. The acetic acid may for instance be added with a peristaltic pump, the pH of the dispersion being controlled until the targeted pH is reached. More particularly, the conditions used in the examples may apply.

Process of Preparation of the Mixed Oxide of the Invention

The mixed oxide of the invention may be prepared by the following process comprising the following steps:
(a1) an aqueous solution comprising sulphate anion ($SO_4^{2-}$), a zirconium chloride salt, a cerium salt and optionally at least one salt of a rare earth element other than cerium and other than lanthanum (salt of RE) reacts with an aqueous basic solution to form a precipitate;
(b1) the precipitate obtained at the end of step (a1) is separated off from the liquid medium;
(c1) the precipitate obtained at the end of step (b1) is heated in an aqueous medium and optionally in the presence of a lanthanum salt with a basic compound;
(d1) a lanthanum salt may optionally be added to the mixture obtained at the end of step (c1) optionally with a basic compound;
(e1) an organic texturing agent is added to the mixture obtained at the end of step (d1);
(f1) the solid material obtained at the end of step (e1) is separated off from the liquid medium and calcined in air;
(g1) the solid material obtained at the end of step (f1) is jet milled to lead to the mixed oxide of the invention.

This process is based on the intimate mixing of the elements of the mixed oxide. This is why in the mixed oxide according to the invention, the oxides are intimately mixed. This distinguishes the mixed oxide from a simple mechanical mixture of oxides in the solid form.

In step (a1), an aqueous solution (designated as the CZR solution) comprising sulphate anion ($SO_4^{2-}$), a zirconium chloride salt, a cerium salt and optionally at least one salt of a rare earth element other than cerium and other than lanthanum (salt of RE) reacts with an aqueous basic solution to form a precipitate. The cerium salt may be cerium nitrate or chloride and also mixtures of these salts. Cerium salt may be composed of cerium (III) salt and optionally cerium (IV) salt. Cerium salts are ionic compounds usually resulting from the neutralization reaction of an acid and a base or dissolution of a cerium compound, such as cerium hydroxide, with an acid. They are composed of cerium cations and anions so that the product is electrically neutral.

The salt of the RE may be for example a nitrate or a chloride, such as praseodymium nitrate, and neodymium nitrate, yttrium(III) chloride ($YCl_3$) or yttrium nitrate ($Y(NO_3)_3$). The aqueous solution may comprise one or several rare earth salts.

The zirconium chloride salt is preferably $ZrOCl_2$.

The CZR solution comprises between 0.5 and 2.0 moles of sulphate anion ($SO_4^{2-}$) per mole of zirconium and cerium elements. The molar ratio $SO_4^{2-}/(Zr+Ce)$ is preferably in the range 0.5-1.0, more particularly in the range 0.5-0.8. Sulphate anions are conveniently provided by the addition of sulphuric acid.

The aqueous basic solution used may comprise a basic compound like an hydroxide of an alkali metal or ammonia. The basic compound may be for example sodium hydroxide, potassium hydroxide or ammonia or mixtures thereof. The basic compound may be NaOH. The amount of the basic compound may easily be decided by measuring the pH change of the solution. Usually, a sufficient amount is such that the pH of the solution is not lower than 7, and a preferred amount is such that the pH is between 7.0 and 11.0. The amount of the basic compound is usually such there is a molar excess of basic compound over the Zr, Ce and RE(s).

To perform the reaction in step (a1), the bringing into contact can be carried out in any order of introducing the reactants. However, it is preferable to introduce the CZR solution into a tank containing the aqueous basic solution. This reaction may be carried out under an inert atmosphere, notably either in a closed reactor or in a semi-closed reactor. The bringing into contact is generally carried out in a stirred tank reactor.

Step (a1) may be performed at a temperature comprised between 5° C. and 50° C.

In step (b1), the precipitate obtained at the end of step (a1) is separated off from the liquid medium. The separation may be performed, for example, with a Nutsche filter, by centrifuging or by decantation. The precipitate may optionally be washed with water. Washing may notably permit to decrease the amount of the free ions, notably to an amount inferior or equal to 500 ppm for each of the ions, preferably inferior or equal to 300 ppm, the ppm being expressed weight amount of each ion/weight of the solid precipitate expressed as oxide×100. For instance, when the starting materials used for the preparation of the mixed oxide are: $ZrOCl_2$, $H_2SO_4$, $CeCl_3$ and optionally at least one chloride or nitrate of RE, washing is used to decrease the amount of the amounts of $SO_4^{2-}$, $Na^+$ and $Cl^-$ left in the precipitate, notably to an amount inferior or equal to 500 ppm for each of the ions, preferably inferior or equal to 300 ppm. The amount of $NO_3^-$ should also be lower than these values.

Further, the precipitate may optionally be dried, notably at a temperature comprised between 40° C. and 80° C.

In step (c1), the precipitate obtained at the end of step (b1) is heated in an aqueous medium and optionally in the presence of a lanthanum salt with a basic compound. The lanthanum salt is preferably chosen in the group consisting of nitrate, chloride, sulfate, phosphate or carbonate. $La(NO_3)_3$ is a convenient source of La that may be used. This thermal treatment consists in heating the medium and in maintaining it at a temperature which is generally comprised between 60° C. and 200° C., and more particularly between 95° C. and 150° C. The duration of this treatment may be between 1 hour and 4 hours. This treatment may also be carried out under an inert atmosphere, the description with respect to this atmosphere for the step (a) being applied similarly here. Similarly the treatment may be carried out in a stirred reactor. After the thermal treatment, the solid material may be washed with water. The washing may be performed in various ways with or without solid/liquid separation. It can thus be carried out by separating the solid particles from the liquid phase, for example by frontal filtration, settling out or centrifugation. The solid obtained is then resuspended in an aqueous phase. The process can also be carried out by tangential filtration. This washing can be optionally repeated if necessary, for example until a given conductivity of the suspension is obtained, whereby the conductivity measures the amount of impurities present in this suspension.

In an optional step (d1), the lanthanum salt, notably in liquid or solid form, may be added to the mixture obtained at the end of step (c1). It has to be noticed that the lanthanum salt is to be added: (i) in step (c1) and/or (ii) in step (d1). When the lanthanum salt is added in step (c1) and in step (d1), a portion of the lanthanum salt is added in step (c1) and another portion of it is added in step (d1).

In step (e1), an organic texturing agent (also usually designated by the term "template agent") is added to the mixture obtained at the end of step (d1). An organic texturing agent refers to an organic compound, such as a surfactant, able to control the porous structure, notably the mesoporous structure, of the mixed oxide. The term "mesoporous structure" refers to an inorganic structure comprising pores with a diameter comprised between 2 and 50 nm, described by the term "mesopores". The organic texturing agent may be added in the form of a solution or a suspension. The amount of the organic texturing agent, expressed as percentage by weight of additive relative to the weight of the mixed oxide obtained after the calcination step (g1), is generally between 5 and 100% and more particularly between 15 and 60%.

The organic texturing agent is preferably chosen in the group consisting of: anionic surfactants, nonionic surfactants, polyethylene glycols, carboxylic acids and their salts, and surfactants of the carboxymethylated fatty alcohol ethoxylate type. With regard to this additive, reference may be made to the teaching of application WO-98/45212 and the surfactants described in this document may be used. As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates. As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®. With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammonium. By way of example, mention may be made more particularly of lauric acid and ammonium laurate. Finally, it is also possible to use a surfactant which is selected from those of the carboxymethylated fatty alcohol ethoxylate type. The expression "product of the carboxymethylated fatty alcohol ethoxylate type" is intended to mean products consisting of ethoxylated or propoxylated fatty alcohols comprising a —$CH_2$—COOH group at the end of the chain.

These products may correspond to the formula:

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$=$CH_2$—O— groups.

In step (f1), the solid material obtained at the end of step (e1) is separated off from the liquid medium and calcined in air. The separation may be performed as for step (b1). The solid material may optionally be washed with an aqueous solution, preferably with water at basic pH, for example with an aqueous solution of ammonia. Further, the precipitate may optionally be dried to a suitable extent. The temperature of the calcination may be comprised between 500° C. and 1200° C., more particularly between 800° C. and 900° C. The selection of the temperature may be made as desired, depending on the required values of the specific surface area and porosity. The duration of the calcination may suitably be determined depending on the temperature, and may preferably be between 1 and 20 hours. For instance, the calcination in air may be performed at 850° C. for 4 hours.

In step (g1), the solid material obtained at the end of step (f1) is jet milled to lead to the mixed oxide of the invention. More details about jet milling are provided below.

The invention relates also to a process of preparation of a mixed oxide as disclosed herein consisting in jet milling a mixed oxide of the same composition as said mixed oxide.

In the context of the invention, the term "jet milling" refers to the operation wherein the particles of a solid material are drawn into an accelerated gas stream and are ground via inter-particle collisions in a jet stream. Comminution is essentially the result of interparticle collision in the jet stream. The gas used is conveniently air. The forces obtained in the jet mill alter the size of the particles and modify the particle size distribution of the particles. The gas is generally accelerated through a series of one or more nozzles at extremely high velocities.

A particular convenient type of jet mill that may be used is the fluidized-bed jet mill because it is energy efficient. Comminution takes place within the fluidized bed of material. An example of fluidized-bed jet mill which may be used is disclosed in U.S. Pat. No. 5,992,773.

An example of jet mill that may conveniently be used and that was effectively used is the fluidized-bed pneumatic jet mill 100AFG commercialized by Hosokawa (see https://www.hosokawa-alpine.com/powder-particle-processing/machines/jet-mills/afg-fluidised-bed-opposed-jet-mill/ or https://www.hosookawa-alpine.com/fileadmin/user_upload/content/Mechanische_Verfahrenstechnik/Applikationen/P/API-Inhaler/0007-EN-2013-04-Pharmaceutical Technology-GMP.pdf for more details: in this latter document available online, the following is disclosed: "principle of operation—The AFG is comprised of two components—the classifier head and the grinding chamber with integrated nozzles, the number of which depends on the mill size. The material particles entering the jets are accelerated and collide with each other in the focal point where the jets of air intersect. Comminution occurs due to inter-particle collision in the focal point and because of shear flows at the edges of the air jets. As a result, the risk of contamination due to abrasion is virtually non-existent. A high-performance Turboplex classifier discharges the end product from the internal grinding process to a separator system. The fineness can be set by adjusting the air flow rate, the grinding air pressure and the classifying wheel speed").

This appliance is generally equipped with a dynamic deflector-wheel air classifier that can be operated at varying speeds to alter the fineness of the product. The parameters of this appliance that may be varied are the following ones: the pressure inside the mill, the number and configuration of fluid nozzles on the mill and the presence of a classifier that removes particles of a desired size while leaving others in the mill for additional milling. The conditions of use of this appliance that were chosen for the preparation of the mixed oxide of the invention may be found in the examples and in the Table below:

| | classifier frequency (Hz) | feeding frequency (Hz) | feeding pressure (bar) | grinding pressure (bar) | nozzle |
|---|---|---|---|---|---|
| "soft" jet mill conditions used in comparative example 1 | 96 | 135 | 2 | 2 | no |
| "hard" jet mill conditions used for the preparation of the mixed oxide of the invention (throughput of 0.5 kg/h) | 260 | 100 | 3 | 4 | yes |

The increase of the classifier frequency, of the feeding pressure and of the grinding pressure and the decrease of the feeding frequency along with the use of a nozzle make it possible to obtain the targeted particle size distribution of the mixed oxide of the invention. Thus, the frequency of the classifier is increased to select the fine particles. In addition, a nozzle is installed to increase the speed of compressed air into the grinding chamber, so as to grind a bit more the material. The feeding frequency and the feeding pressure have an influence on the number of particles in the milling chamber. The decrease of the feeding frequency and the increase of the feeding pressure thus influence the number of collisions within this chamber.

The invention also relates to a mixed oxide obtainable by the processes disclosed above.

Use of the Mixed Oxide of the Invention

The mixed oxide of the invention may be used in the field of exhaust gas treatment. The mixed oxide of the invention may be used to reduce the amounts of pollutants present in an exhaust gas released by the internal combustion engine of a vehicle.

The mixed oxide may be used in the preparation of a catalytic converter which is used to treat exhaust gases released by the internal combustion engine of a vehicle. The catalytic converter comprises at least one catalytically active layer prepared by depositing a catalytic composition on a solid support. The function of the layer is to chemically convert some pollutants of the exhaust gas into products that are less harmful to the environment. The solid support may be a monolith made of ceramic, for example of cordierite, of silicon carbide, of alumina titanate or of mullite, or of metal, for example Fecralloy. The support is usually made of cordierite exhibiting a large specific surface area and a low pressure drop. The monolith is often of the honeycomb type.

The catalytic composition comprises:
  (i) alumina;
  (ii) one or more platinum group metals; and
  (iii) at least one the mixed oxide of the invention.

The mixed oxide may be used for the preparation of a catalytic wall-flow monolith. The catalytic wall-flow monolith comprises a porous support and the catalytic composition on the surface of the support. Wall-flow monoliths are well-known in the art for use as particulate filters. They work by forcing a flow of the exhaust gas (including particulate matter) to pass through the walls formed of the porous support. The porosity helps retain the particulate matter. The monolith preferably has a first face and a second face defining a longitudinal direction therebetween. In use, one of the first face and the second face will be the inlet face for exhaust gases and the other will be the outlet face for the treated exhaust gas. As is conventional for a wall-flow monolith, it has first and second pluralities of channels extending in the longitudinal direction. The first plurality of channels is open at the first face and closed at the second face. The second plurality of channels is open at the second face and closed at the first face. The channels are preferably parallel to each other to provide a constant wall thickness between the channels. As a result, gases entering one of the plurality of channels cannot leave the monolith without diffusing through the channel walls into the other plurality of channels.

The channels are closed with the introduction of a sealant material into the open end of a channel.

Preferably the number of channels in the first plurality is equal to the number of channels in the second plurality, and each plurality is evenly distributed throughout the monolith. Preferably within a plane orthogonal to the longitudinal direction, the wall-flow monolith has from 100 to 500 channels per square inch (cpsi), preferably from 200 to 400 cpsi. For example, on the first face, the density of open first channels and closed second channels is from 200 to 400 channels per square inch. The channels can have cross sections that are rectangular, square, circular, oval, triangular, hexagonal, or other polygonal shapes.

In order to facilitate the passage of the exhaust gas to be treated through the channel walls, the monolith is formed out of a porous substrate. The substrate also acts as a support for holding the catalytic composition. Suitable materials for forming the porous substrate include ceramic-like materials such as cordierite, silicon carbide, silicon nitride, zirconia, mullite, spodumene, alumina-silica-magnesia or zirconium silicate, or of porous, refractory metal. Wall-flow substrates may also be formed of ceramic fibre composite materials. Preferred wall-flow substrates are formed from cordierite and silicon carbide. Such materials are able to withstand the environment, particularly high temperatures, encountered in treating the exhaust streams and can be made sufficiently porous. Such materials and their use in the manufacture of porous monolith substrates is well known in the art.

The catalytic composition is applied on the porous substrate in the form of a layer. Traditionally, the loading of the layer should not be too high to avoid back-pressure. The loading may be between 1.0 g/in$^3$ to 0.1 g/in$^3$, preferably from 0.7 g/in$^3$ to 0.25 g/in$^3$, and most preferred from 0.6 g/in$^3$ to 0.5 g/in$^3$.

The catalytic composition comprises alumina, preferably gamma-alumina. The alumina may also comprise lanthanum, praseodymium or a combination of the two. Alumina is preferably a lanthanum-stabilized alumina. Alumina is an advantageous carrier material since it exhibits a high surface area and is a refractory metal oxide. This leads to good thermal capacity which is required for the high-temperature conditions encountered. The catalytic composition also comprises one or more platinum group metals (PGM). The PGM is selected from the group consisting of Pt, Pd, Rh, Re, Ir. The PGM serve to catalyse the reactions required to treat the exhaust gas and the combustion of the soot particles. Preferably the PGM is Pt, Pd and Rh; Pd and Rh; or Pd only; or Rh only.

A method that may used for the preparation of a catalytic wall-flow monolith is disclosed in WO 2017/109514, the content of which is entirely incorporated by reference. More particularly, the method disclosed in example 3 of WO 2017/109514 may be used.

The mixed oxide of the invention may also be used for the preparation of a catalytic monolith for use in an exhaust gas treatment system. The monolith is usually in the form of a honeycomb monolith.

EXAMPLES

The following examples are given to illustrate the invention. The proportions of the elements of the mixed oxides are given by weight of oxides.

Distribution of Sizes of the Particles

The distribution of sizes of the particles was determined with a laser particle size analyzer (Model LS13320 of Beckman-Coulter). The Fraunhofer mode was used following the guidelines of the constructor. The distributions of sizes (in volume) were obtained from a dispersion of the particles in water in the presence of a dispersant (sodium hexametaphosphate). A relative refractive index of 1.6 was used. From the distribution in volume, the values of d10, d50, d90 and d99 were obtained. In the tables below, they are given in μm.

Specific Surface Area (BET)

The specific surface areas were determined automatically by $N_2$ adsorption on a NOVA 4000e of Quantachrome. Prior to any measurement, the samples are degassed to desorb the volatile species and to clean the surface.

Porosity

The porosity is obtained with an autopore V 9620 Automatic Mercury Porosimeter following the guidelines of the constructor. TPV and $PV_{0\text{-}300\ nm}$ are given after calcination in air of the mixed oxide at 1100° C. for 4 hours. The procedures outlined in ASTM International test method D 4284-07 were followed; the sample size was around 0.5 grams, the mercury contact angle was 130°, the mercury surface tension was 485 dyn/cm.

Viscosity: measurement of the viscosity V of a dispersion of the mixed oxide of the invention in water (1) an homogeneous dispersion of the mixed oxide of the invention is prepared by mixing the particles of the mixed oxide in water in a 1 L beaker with the aid of an anchor (diameter 8.7 cm) spinning at 360 rpm and positioned 2 cm above the bottom of the beaker:
 (1a) 500 mL of water is added in the beaker;
 (1b) the mixed oxide in the powder form (377.2 g) is then added in about 15 min;
 (1c) the pH is adjusted to 4.0±0.1 with acetic acid;
(2) the viscosity is then recorded with the rheometer over time. When the viscosity is constant, it is measured.

Step (1b) may be performed by adding the mixed oxide by a vibration feeder. Step (1c) may be performed by adding the acetic acid with a peristaltic pump and by controlling the pH of the dispersion until the targeted pH is reached.

The rheometer used was a Brookfield DV2T.

Example 1: Preparation of a Mixed Oxide Zr—Ce—La 60%-35%-5%

A cochloride solution (CZR solution) was first prepared with 47 L of $H_2O$ and 16 L of an aqueous solution of $CeCl_3$ (1.53 mol/L and density 1.33), to which was added 20.2 kg of an aqueous solution of $ZrOCl_2$ (36.2 wt % $ZrO_2$; loss of ignition LOI 63.6%). An aqueous solution of $H_2SO_4$ (8.77 wt % and density 1.05) was then added.

The CZR solution was transferred in 50 min in a precipitation tank preloaded with 110 L of an aqueous solution of NaOH (10.8% wt and density 1.099). The agitation speed during the precipitation was fixed at 220 rpm. The slurry was washed by filtration/repulping in order to remove all the $SO_4^{2-}$, $Na^+$ and $Cl^-$ ions (below 200 ppm for each ion). After repulping in water at 80 g/L, the slurry was aged at 125° C. during 1 hour. After ageing $La(NO_3)_3$ was introduced in order to obtain the desired amount of lanthanum oxide (5% wt of $La_2O_3$). 4 kg of lauric acid were then added to the dispersion under stirring for 1 hour. The suspension was then filtered and the solid was calcined at 850° C. for 3 hours. The obtained oxide material was jet milled under the conditions described below.

Properties of the mixed oxide after the milling: d50 of 1.9 μm and d90 of 6.0 μm. The specific surface area of the product after calcination in air at 1100° C. for 4 hours is: $S_{1100° C./4 h}=28$ m$^2$/g. The viscosity was measured at 20.0 cP.

| conditions of milling | classifier frequency (Hz) | feeding frequency (Hz) | feeding pressure (bar) | grinding pressure (bar) | nozzle |
|---|---|---|---|---|---|
| "strong" jet mill conditions | 260 | 100 | 3 | 4 | yes |

Example 2 to 6: Preparation of Mixed Oxides of Other Compositions

The same process as described for example 1 was used to prepare mixed oxides of various other compositions:
example 2: Zr—Ce—La—Y 50%-40%-5%-5%
example 3: Zr—Ce—La—Y 55%-35%-7.5%-2.5%
example 4: Zr—Ce—La—Y 60%-24%-3.5%-12.5%
example 5: Zr—Ce—La—Y 60%-30%-5%-5%
example 6: Zr—Ce—La 75%-20%-5%

For the mixed oxides containing Y, the CZR solution contained the required quantities of $CeCl_3$, of $ZrOCl_2$ and of $Y(NO_3)_3$. $H_2SO_4$ was also added to so that the molar ratio $SO_4^{2-}/(Zr+Ce)$ is between 0.5 and 0.8.

The obtained mixed oxides after calcination at 850° C. were jet milled under the same conditions as in example 1. The obtained particle size characteristics are: a d50 between 1.0 μm and 2.5 μm and a d90 between 2.0 μm and 9.0 μm (see Table I).

| Conditions of milling | classifier frequency (Hz) | feeding frequency (Hz) | feeding pressure (bar) | grinding pressure (bar) | nozzle |
|---|---|---|---|---|---|
| "soft" jet mill conditions | 96 | 135 | 2 | 2 | no |

After milling, the mixed oxide exhibits a d50 between 3.5 and 4.5 μm and a d90 below 15 μm. The specific surface area of the product after calcination in air at 1100° C. for 4 hours is: $S_{1100° C./4 h}=29$ m$^2$/g. The viscosity was measured over 1000 cP, thus much higher than that of the product of example 1.

Comparative Example 2: Preparation of Mixed Oxide Zr—Ce—La 60%-35%-5%, Prepared with the Process of WO 2012/072439 Involving Nitrates and Milled with a Hammer Mill This comparative example relates to the preparation of a mixed oxide of the same composition as the mixed oxide of example 1. The mixed oxide was prepared according to the process disclosed in WO 2012/072439 involving nitrates. Two solutions of nitrates were prepared beforehand, one consisting of cerium nitrate and zirconium nitrate and the other of lanthanum nitrate. 324 mL of water was introduced into a first beaker with 102 mL of an aqueous solution of zirconium nitrate $ZrO(NO_3)_2$ ($[ZrO_2]=265$ g/L and d=1.408) and with 68 mL of an aqueous solution of cerium nitrate $Ce^{IV}$ ($[CeO_2]=270$ g/L and d=1.43). 5.5 mL of an aqueous solution of lanthanum nitrate ($[La_2O_3]=454$ g/L and d=1.687) was introduced into a second beaker.

Into a reactor equipped with an inclined-blade stirring rotor, a solution of aqueous ammonia (12 mol/L) and subsequently distilled water are introduced, with stirring, so as to obtain a total volume of 0.5 liter and a stoichiometric excess of aqueous ammonia of 40% relative to the cations to be precipitated.

The first solution of nitrates is introduced, over the course of 45 minutes, into the reactor stirred at a speed of 500 rpm, the second solution of nitrates is introduced over the course

TABLE I examples 1-6

| Ex | Zr | Ce | La | Y | d10 (μm) | d50 (μm) | d90 (μm) | d99 (μm) | $S_{1100° C./4 h}$ (m$^2$/g) | TPV (mL/g) | $PV_{0-300 nm}$ (mL/g) | viscosity (cP) |
|---|---|---|---|---|---|---|---|---|---|---|---|---|
| 1 | 60 | 35 | 5 | | | 1.9 | 6.0 | | 28.0 | | | 20.0 |
| 2 | 50 | 40 | 5 | 5 | 0.6 | 1.8 | 5.0 | 7.0 | 28.0 | | | 25.0 |
| 3 | 55 | 35 | 7.5 | 2.5 | 0.7 | 1.8 | 4.4 | 7.2 | 30.4 | 1.65 | 0.59 | |
| 4 | 60 | 24 | 3.5 | 12.5 | | 1.8 | 5.0 | | 34.0 | 1.86 | 0.67 | |
| 5 | 60 | 30 | 5 | 5 | | 1.6 | 4.0 | | 29.2 | 2.12 | 0.65 | |
| 6 | 75 | 20 | 5 | | | 1.9 | 5.0 | | 31.7 | 1.52 | 0.50 | |

Comparative Example 1: Preparation of a Mixed Oxide Zr—Ce—La 60%-35%-5% with "Soft" Jet Milling This comparative example relates to the preparation of a mixed oxide of the same composition as the mixed oxide of example 1. The conditions of preparation of the mixed oxide are the same as for example 1 except the conditions of milling. Milling was performed by a jet milling process under softer and more usual conditions as described in the table here below:

of 15 minutes and the stirring is fixed at 250 rpm. The resulting precipitate suspension is placed in a stainless steel autoclave equipped with a stirring rotor. The temperature of the medium is brought to 150° C. for 2 hours with stirring. 33 grams of lauric acid are added to the resulting suspension. The suspension is kept stirring for 1 hour.

The suspension is filtered through a Büchner funnel, and then washed with aqueous ammonia solution. The product obtained is then calcined in air at 850° C. for 4 hours. The resulting product was ground with a hammer mill. Properties of the mixed oxide after milling: d50=2.0 μm and d90=6.0

µm. The specific surface area of the product after milling is: $S_{1100°\ C./4\ h}=22\ m^2/g$, lower than for the product of example 1 ($28\ m^2/g$).

Comparative Example 3: Preparation of a Mixed Oxide Zr—Ce—La 60%-35%-5% with "Soft" Jet Mill+Wet Mill This example relates to the preparation of a mixed oxide of the same composition as example 1, i.e. based on cerium, zirconium, lanthanum in the respective proportions by weight of oxide of 35%, 60%, 5%. First, a cochloride solution was prepared with deionized water (47 L), an aqueous solution of cerium chloride $CeCl_3$ (16 L, [C]=1.53 mol/l and density 1.33), an aqueous solution of lanthanum chloride $LaCl_3$ in order to get 5% wt of $La_2O_3$, and an aqueous solution of $ZrOCl_2$ (20.2 kg, 36.2 wt % $ZrO_2$ LOI 63.6%). An aqueous solution of $H_2SO_4$ was then introduced (65 L, 8.77 wt % and density 1.05). The solution was transferred in 50 min in a precipitation tank preloaded with 110 L of an aqueous solution of NaOH (10.8% wt and density 1.099). The agitation speed during the precipitation was fixed at 220 rpm. The slurry was washed by filtration/repulping in order to remove all the $SO_4^{2-}$, $Na^+$ and $Cl^-$ ions (below 200 ppm for each ions). After repulping in water at 80 g/L, the slurry was aged at 97° C. during 1 hour.

4 kg of lauric acid were then added to the dispersion under stirring for 1 hour. The suspension was then filtered and the solid was calcined at 850° C. for 3 hours. The material is jet milled in soft usual conditions as in comparative example 1. Then 400 g of the obtained powder is dispersed in 1 L of distilled water and pH is adjusted to 4 by acetic acid. Further milling is carried out on the obtained suspension by a wet milling equipment in order to obtain a d50 between 0.8 to 1.0 µm and a d90 below 5 µm. The solid is further separated and calcined for characterization. The specific surface area of the obtained material after calcination at 1100° C. for 4 hours is very low: $S_{1100°\ C./4\ h}=18\ m^2/g$.

These comparative examples show that the mixed oxide of the invention exhibits a compromise between $S_{1100°\ C./4\ h}$, TPV, $PV_{0-300\ nm}$ and a low viscosity V.

Comparative Example 4: Preparation of Mixed Oxide Zr—Ce—La—Y 55%-35%-7.5%-2.5% with Soft Milling A mixed oxide of the same composition as example 3 (Zr—Ce—La—Y 55%-35%-7.5%-2.5%) was prepared under the same conditions except the conditions of milling. Milling was performed by a jet milling process under softer and more usual conditions as in comparative example 1.

As can be observed, on the one hand, the size of the particles is lower in example 3 than in comparative example 4 due to milling in stronger conditions; on the other hand, the TPV is larger. The same trend is observed for the pore volume below pores of 300 nm ($PV_{0-300\ nm}$).

Comparative Example 5 and 6: Preparation of a Mixed Oxide Zr—Ce—La—Y 55%-35%-7.5%-2.5% Prepared with the Process of WO 2012/072439 Involving Nitrates—Impact of Milling Conditions Two mixed oxides of the same composition as example 3 (Zr—Ce—La—Y 55%-35%-7.5%-2.5%) were prepared with the process of WO 2012/072439 involving nitrates, as described in comparative example 2, except the conditions of milling. Milling was performed by a jet milling process:

comparative example 5: stronger conditions as in example 1;

comparative example 6: soft and usual conditions as in comparative example 1.

As can be observed, in the case of mixed oxides based on the process of WO 2012/072439, when the size of the particles is lower due to milling in stronger conditions, the TPV is also lower. The same trend is observed for the pore volume below pores of 300 nm ($PV_{0-300\ nm}$).

TABLE II comparative examples 1-3

| Ex | Route | Zr | Ce | La | Y | Milling conditions | d10 | d50 | d90 | d99 | $S_{1100°\ C./4\ h}$ ($m^2/g$) | V (cP) | Tapped density |
|---|---|---|---|---|---|---|---|---|---|---|---|---|---|
| 1 | Cl | 60 | 35 | 5 | | "Strong" jet mill | | 1.9 | 6.0 | | 28 | 20 | |
| Comp 1 | Cl | 60 | 35 | 5 | | "Soft" jet mill | | 3.5-4.5 | 15.0 | | 29 | >1000 | |
| Comp 2 | $NO_3$ | 60 | 35 | 5 | | Hammer mill | | 2.0 | 6.0 | | 22 | | |
| Comp 3 | Cl | 60 | 35 | 5 | | "Soft" jet mill + wet mill | 0.2 | 1.0 | 4.0 | 7 | 18 | 7 | 0.66 |

TABLE III comparative examples 4-5

| Ex | Route | Zr | Ce | La | Y | Milling conditions | d10 | d50 | d90 | d99 | $S_{1100° C./4 h}$ (m²/g) | TPV (mL/g) | $PV_{0-300 nm}$ (mL/g) |
|---|---|---|---|---|---|---|---|---|---|---|---|---|---|
| 3 | Cl | 55 | 35 | 7.5 | 2.5 | "Strong" jet mill | 0.7 | 1.8 | 4.4 | 7.2 | 30.4 | 1.65 | 0.59 |
| Comp 4 | Cl | 55 | 35 | 7.5 | 2.5 | "Soft" jet mill | 1.0 | 3.8 | 14.4 | 30.2 | 32.6 | 1.08 | 0.34 |
| Comp 5 | NO₃ | 55 | 35 | 7.5 | 2.5 | "Strong" jet mill | 0.5 | 1.9 | 5.5 | 9.3 | 23.8 | 0.94 | 0.21 |
| Comp 6 | NO₃ | 55 | 35 | 7.5 | 2.5 | "Soft" jet mill | 1.1 | 5.5 | 17.6 | 29.6 | 27.1 | 0.94 | 0.26 |

The process of preparation of the mixed oxide has also an influence. The mixed oxide of example 3 was prepared with a cochloride solution whereas the mixed oxide of comparative example 5 was prepared with a conitrate solution. Even though the milling is the same, the specific surface area, the TPV and $PV_{0-300 nm}$ are lower for comparative example 5.

The invention claimed is:

1. A mixed oxide comprising zirconium, cerium, lanthanum and optionally at least one rare earth element other than cerium and other than lanthanum (RE) with the following proportion:
   between 8.0% and 45.0% by weight of cerium;
   between 1.0% and 15.0% by weight of lanthanum;
   up to 15.0% by weight of the at least one rare earth element other than cerium and other than lanthanum;
   the total proportion of lanthanum and the at least one rare earth element(s) other than cerium and other than lanthanum being lower than or equal to 25.0%;
   the remainder as zirconium;
   the proportions of the cerium, zirconium, lanthanum, and RE being given by weight of oxide relative to the mixed oxide as a whole,
   the mixed oxide exhibiting the following properties after calcination in air at 1100° C. for 4 hours:
   a specific surface area ($S_{1100° C./4 h}$) between 25 m²/g and 50 m²/g;
   a pore volume ($PV_{0-300 nm}$) determined by mercury porosimetry for pores having a diameter below 300 nm between 0.50 cm³/g and 0.90 cm³/g;
   the mixed oxide being in the form of particles with the following properties:
   a d50 between 1.0 μm and 2.5 μm;
   a d90 between 2.0 μm and 9.0 μm
   wherein the above mentioned elements are present in the mixed oxide as oxides.

2. A mixed oxide consisting of a combination of oxides of zirconium; of cerium; of lanthanum; optionally of at least one rare earth element other than cerium and other than lanthanum (RE); and optionally of hafnium, with the following proportion:
   between 8.0% and 45.0% by weight of cerium;
   between 1.0% and 15.0% by weight of lanthanum;
   up to 15.0% by weight of the at least one rare earth element other than cerium and other than lanthanum;
   the total proportion of lanthanum and the at least one rare earth element(s) other than cerium and lanthanum being lower than or equal to 25.0%;
   a proportion of hafnium lower than or equal to 2.5%; the remainder as zirconium;
   the proportions of the cerium, zirconium, lanthanum, and RE being given by weight of oxide relative to the mixed oxide as a whole,
   exhibiting the following properties after calcination in air at 1100° C. for 4 hours:
   a specific surface area ($S_{1100° C./4 h}$) between 25 m²/g and 50 m²/g;
   a pore volume determined by mercury porosimetry for pores having a diameter below 300 nm between 0.50 cm³/g and 0.90 cm³/g;
   the mixed oxide being in the form of particles with the following properties:
   a d50 between 1.0 μm and 2.5 μm;
   a d90 between 2.0 μm and 9.0 μm.

3. The mixed oxide according to claim 1 characterized by the following proportions:
   between 18.0% and 37.0% by weight of cerium;
   between 3.0% and 9.0% by weight of lanthanum;
   the remainder as zirconium;
   or
   between 30.0% and 45.0% by weight of cerium;
   between 3.0% and 9.0% by weight of lanthanum;
   between 3.0% and 9.0% by weight of at least one rare earth element other than cerium and other than lanthanum (RE);
   the remainder as zirconium;
   or
   between 20.0% and 35.0% by weight of cerium;
   between 3.0% and 9.0% by weight of lanthanum;
   between 3.0% and 15.0% by weight of at least one rare earth element other than cerium and other than lanthanum (RE);
   the remainder as zirconium.

4. The mixed oxide according to claim 1 further comprising hafnium, the proportion of hafnium in the mixed oxide being lower than or equal to 2.5%, and the proportion being given by weight of oxide relative to the mixed oxide as a whole.

5. The mixed oxide according to claim 1 wherein the proportion of cerium is between 18.0% and 37.0% by weight.

6. The mixed oxide according to claim 1 wherein the proportion of zirconium is higher than 45% by weight.

7. The mixed oxide according to claim 1 comprising a weight ratio of $ZrO_2/CeO_2 > 1.0$.

8. The mixed oxide according to claim 1 wherein the d50 is between 1.0 μm and less than 2.5 μm.

9. The mixed oxide according to claim 1 wherein the particles exhibit a d10 lower than or equal to 1.0 μm.

10. The mixed oxide according to claim 1 wherein the particles exhibit a d10 higher than or equal to 0.2 and lower than or equal to 1.0 μm.

11. The mixed oxide according to claim 1 wherein the particles exhibit a d99 lower than or equal to 20.0 and higher than or equal to 5.0 μm.

12. The mixed oxide according to claim 1 wherein the particles exhibit a d99 higher than or equal to 5.0 µm.

13. The mixed oxide according to claim 1 exhibiting a total pore volume determined by mercury porosimetry after calcination in air at 1 100° C. for 4 hours between 1.40 cm³/g and 3.00 cm³/g.

14. The mixed oxide according to claim 1 wherein the viscosity of a dispersion containing 43.0 wt % of particles of the mixed oxide in water and exhibiting a pH of 4.0±0.1 is lower than or equal to 20.0 cP, the viscosity being measured at 20° C.±1° C. and for a shear rate applied between 5.0 and 10.0 s$^{-1}$.

15. The mixed oxide according to claim 1 wherein after calcination in air at 1100° C. for 4 hours, the mixed oxide exhibits a specific surface area ($S_{1100°\ C./4\ h}$)) between 28 and 50 m²/g.

16. The mixed oxide according to claim 1 wherein after calcination in air at 1100° C. for 4 hours, the mixed oxide exhibits a specific surface area ($S_{1100°\ C./4\ h}$) between 30 and 50 m²/g.

17. The mixed oxide according to claim 1 wherein after calcination in air at 1100° C. for 4 hours, the mixed oxide exhibits a pore volume determined by mercury porosimetry for the pores having a diameter below 300 nm ($PV_{0-300\ nm}$) between 0.50 cm³/g and 0.70 cm³/g.

18. The mixed oxide according to claim 1 wherein after calcination in air at 1100° C. for 4 hours, the mixed oxide exhibits a total pore volume determined by mercury porosimetry which is between 1.50 cm³/g and 2.50 cm³/g.

19. The mixed oxide according to claim 1 wherein after calcination in air at 1100° C. for 4 hours, the mixed oxide exhibits a total pore volume determined by mercury porosimetry of at least 1.60 cm³/g.

20. The mixed oxide according to claim 1 wherein RE is Y or Nd or a combination of Y and Nd.

21. The mixed oxide according to claim 1 wherein the d50 is between 1.0 µm and 2.2 µm.

22. The mixed oxide according to claim 1 wherein the d50 is between 1.0 µm and 2.0 µm.

23. The mixed oxide according to claim 1 wherein the d50 is between 1.5 µm and 2.0 µm.

24. The mixed oxide according to claim 1 wherein the d90 is between 2.0 µm and 8.0 µm.

25. The mixed oxide according to claim 1 wherein the d90 is between 2.0 µm and 7.0 µm.

26. The mixed oxide according to claim 1 wherein the d90 is between 3.0 µm and 8.0 µm.

27. The mixed oxide according to claim 1 wherein the d90 is between 3.0 µm and 7.0 µm.

28. A catalytic composition comprising:
   alumina;
   one or more platinum group metals; and
   the mixed oxide according to claim 1.

29. A catalytic wall-flow monolith comprising a porous support and the catalytic composition of claim 28 on the surface of the support.

30. A method of preparing a catalytic converter or a catalytic wall-flow monolith comprising:
   depositing a catalytic composition as a layer on a solid support;
   wherein the catalytic composition comprises the mixed oxide according to claim 1.

31. A process of preparing the mixed oxide according to claim 1 comprising the following steps:
   (a1) reacting an aqueous solution comprising sulphate anion ($SO_4^{2-}$), a zirconium chloride salt, a cerium salt and optionally at least one salt of a rare earth element other than cerium and other than lanthanum with an aqueous basic solution to form a precipitate;
   (b1) separating off the precipitate obtained at the end of step (a1) from an aqueous medium;
   (c1) heating the precipitate obtained at the end of step (b1), in an aqueous medium and optionally in the presence of a lanthanum salt with a basic compound;
   (d1) adding to the mixture obtained at the end of step (c1), optionally with a lanthanum salt;
   (e1) adding an organic texturing agent to the mixture obtained at the end of step (d1);
   (f1) separating off a solid material obtained at the end of step (e1) from the aqueous medium and calcining the separated solid material in air;
   (g1) jet milling the seperated solid material obtained at the end of step (f1).

32. The process according to claim 31 wherein the zirconium chloride salt is $ZrOCl_2$.

33. The process according to claim 31 wherein the molar ratio of $SO_4^{2-}/(Zr+Ce)$ of the aqueous solution of step (a1) is in the range of 0.5-1.0.

34. The process of preparing the mixed oxide according to claim 31, further comprising jet milling the mixed oxide.

* * * * *